April 25, 1944.

T. WAINMAN 2,347,585

MACHINE FOR INLAYING

Filed Jan. 11, 1940

INVENTOR
*Thomas Wainman*
BY
*Norman A. Holland*
ATTORNEY

April 25, 1944.  T. WAINMAN  2,347,585
MACHINE FOR INLAYING
Filed Jan. 11, 1940  4 Sheets-Sheet 2

INVENTOR
Thomas Wainman
BY
Norman H. Holland
ATTORNEY

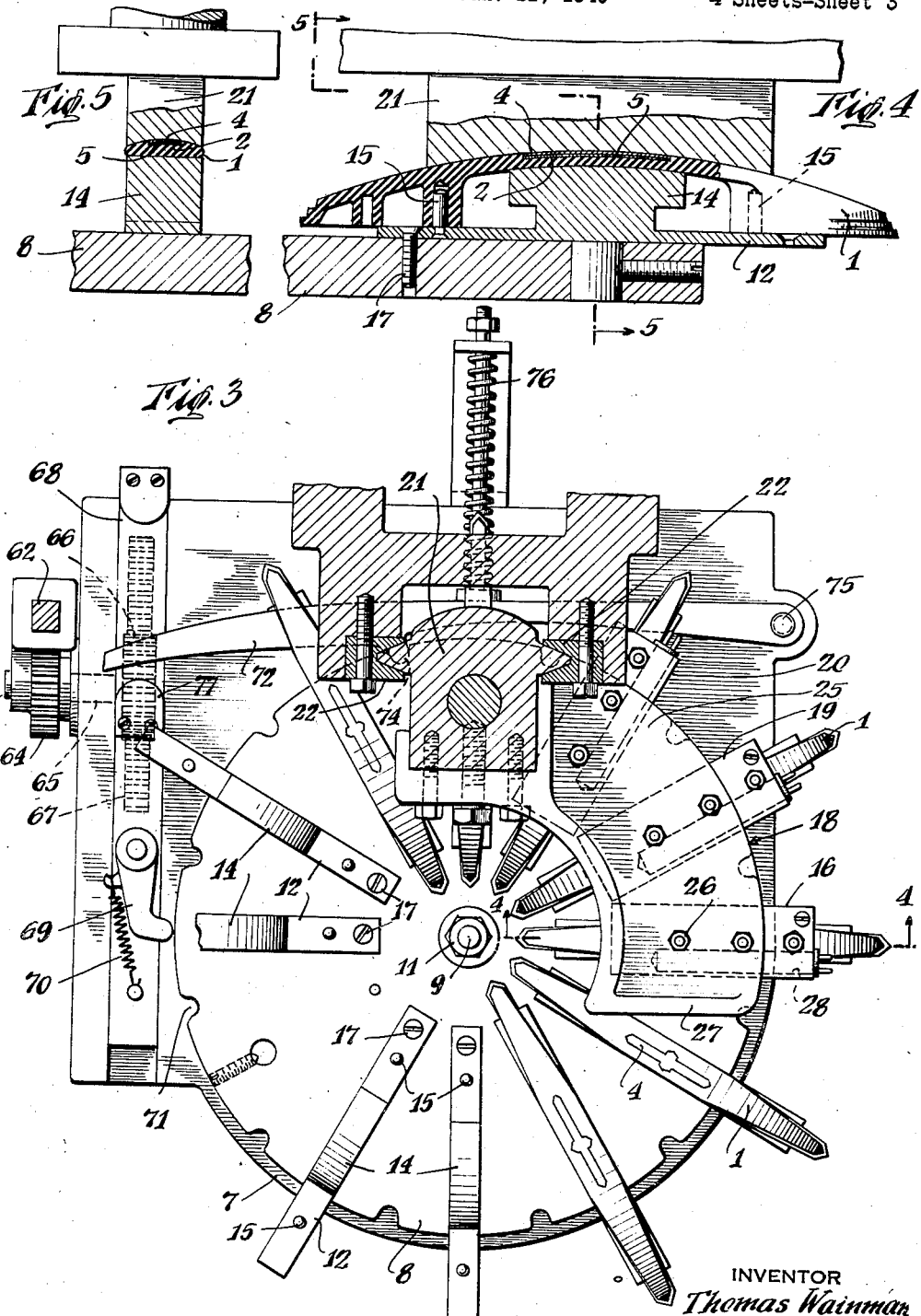

April 25, 1944.                T. WAINMAN                    2,347,585
                            MACHINE FOR INLAYING
                             Filed Jan. 11, 1940              4 Sheets-Sheet 4
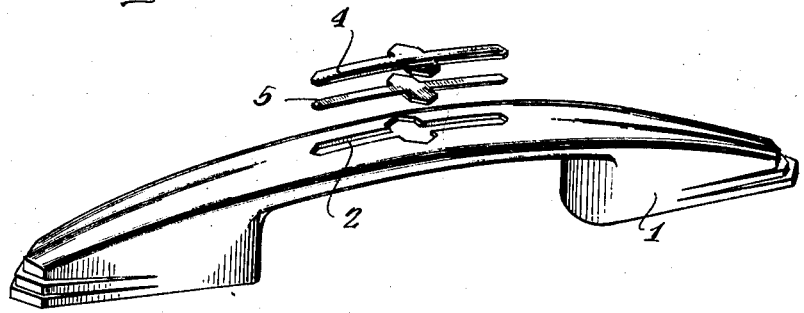
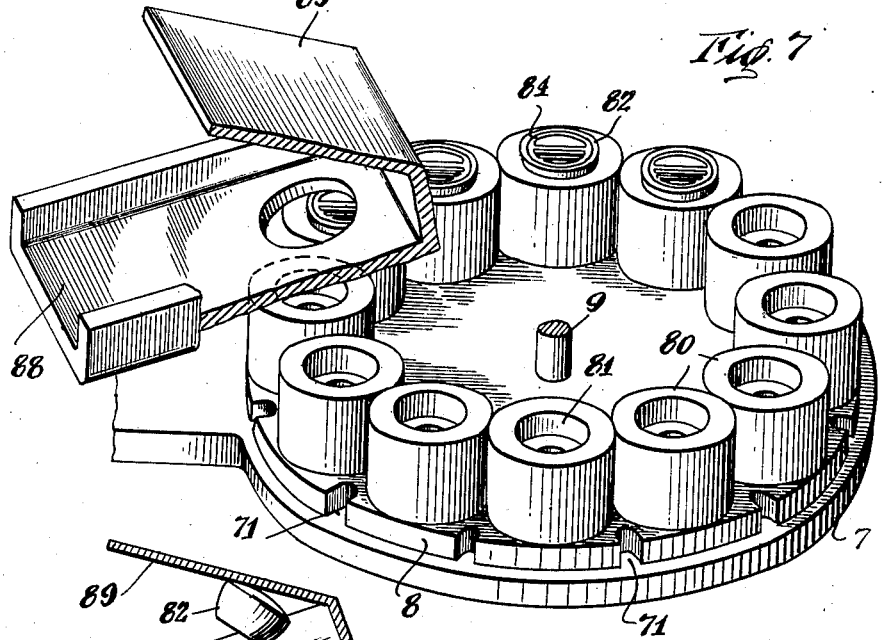
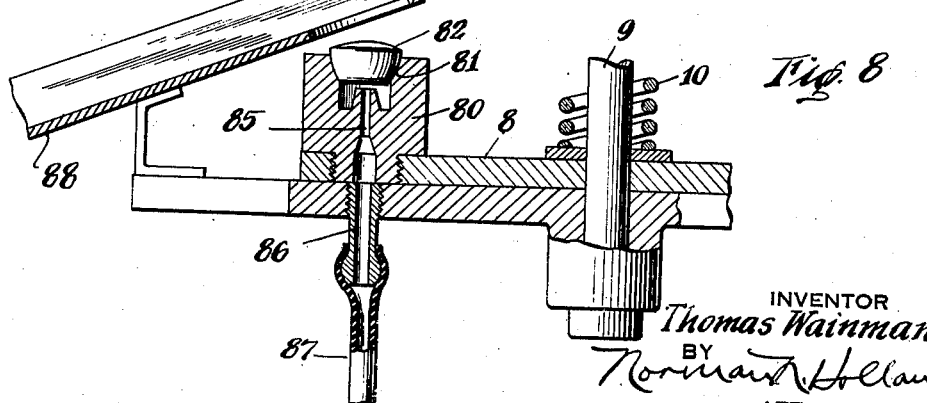
INVENTOR
Thomas Wainman
BY
Norman Holland
ATTORNEY Patented Apr. 25, 1944

2,347,585

UNITED STATES PATENT OFFICE 2,347,585

MACHINE FOR INLAYING

Thomas Wainman, Arlington, N. J., assignor to Plastic Inlays, Inc., Summit, N. J., a corporation of New Jersey Application January 11, 1940, Serial No. 313,389

14 Claims. (Cl. 41—1)

The present invention relates to inlaying and more particularly to an improved machine for inlaying metal inlays into articles and particularly articles molded from synthetic resin compounds.

Plastic products are supplanting both metals and wood for various uses. For example, in cars various parts are now made of plastics which were formerly made of wood or metal. The possibility has been considered of molding the bodies of aeroplanes from plastics. With such extensive use the appearance of molded parts has become commonplace. Efforts have been made to improve the appearance by utilizing various colors of materials but that has its limitations as there are only a limited number of distinctive colors. Inlaying offers unlimited designs with various types and colors of metal. However, inlaying of plastics presents problems which are difficult to overcome. First, in molding recesses in plastic articles, there are definite limitations in the manufacture which require large tolerances in the dimensions of the recesses. Secondly the plastics commonly used, particularly those molded from phenolic condensation products, are hard and brittle and tend to chip and crack, causing defects not tolerated by purchasers. Third, the hardness of the material and the dimensional tolerances make it difficult to fix the inlays securely in recesses so that there will be no danger of their coming out. This is complicated by reason of the parts being subjected during their use to varying temperature and weather conditions. Fourth, the parts are used in large quantities and their cost must be kept at a minimum to insure their extensive use.

The present invention aims to minimize or overcome the above objections by providing a machine for inlaying which reduces the cost of inlaying, permits greater tolerances in the recess dimensions of the articles to be inlaid, and securely fixes the inlays in the recesses regardless of the plastic material used and achieves the result without chipping or breaking the articles.

An object of the present invention is to provide an improved machine for inlaying articles, particularly articles molded from synthetic resin compounds.

Another object of the invention is to reduce the cost of inlaying molded articles.

Another object of the invention is to provide an improved machine which will inlay recesses in molded articles varying a maximum amount dimensionally from a predetermined standard.

Another object of the invention is to provide a machine which is rapid in operation and which fixes the inlays securely in position to insure against accidental dislodgment.

Another object of the invention is to provide a machine for forcing the inlay in position by successive operations securely to embed the edges of the inlay in the article.

A further object of the invention is to provide a machine for inlaying wherein the edges of the inlay can be embedded in hard materials such as articles molded from phenolic condensation products.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a front elevational view of the machine;

Fig. 3 is a sectional view of the machine along the line 3—3 of Fig. 1;

Fig. 4 is a detailed sectional view taken on line 4—4 of Fig. 3 illustrating one of the pressure members forcing a metal inlay into a recess in a molded article;

Fig. 5 is a sectional view along the line 5—5 of Fig. 4;

Fig. 6 is an exploded perspective view of an article and metal inlay adapted to be assembled by the present machine;

Fig. 7 is a perspective view of another form of work holder for application of inlays to knobs and the like; and Fig. 8 is a sectional view at the delivery station of one of the holders shown in Fig. 7.

The drawings show a preferred embodiment of the machine. It will be understood of course that, for different types of inlays and for different shapes of articles to be inlaid, certain changes will be desirable in the machine, particularly in the work holders for holding the articles to be inlaid and the pressure members for applying pressure to the inlays.

Described generally, the preferred embodiment of the invention comprises a press having a table adapted to be rotated intermittently under the press head. The table carries a series of work holders for engaging and retaining the articles to be inlaid. The pressure head is reciprocated vertically by a suitable drive to force the metal inlays into the recesses in the articles and to embed the edges of the metal inlays into the articles to prevent accidental dislodgment. The pressure head embodies a plurality of pressure members, herein illustrated as four, to engage a plurality of articles simultaneously, and completes a single article at each operation of the press. In this way the pressure is applied to the metal and the edges of the metal are embedded in the molded article in four stages. In addition, the pressure heads with the exception of the last one to engage the article are heated to a substantial temperature so that the metal inlays will in turn be heated, which in turn will heat locally the parts of the recess into which the edges are to be embedded to facilitate secure engagement of the inlay. The drive of the press is such that the pressure head can be retained in effective position for a predetermined period which can be readily changed to obtain optimum results. The table supporting the work holders is rotated step by step to present the work to the pressure head. The operator has ample opportunity and space to remove the inlaid parts and to place in the holders articles to be inlaid.

Referring more particularly to Fig. 6, there is shown an exploded view of a handle 1 which may be molded of a synthetic resin compound, for example, "Bakelite," "Durez," and other similar materials. The handle has a recess 2 of a desired shape and depth to receive a metal inlay 4. The metal inlay is preferably curved slightly so that when pressure is applied to it, it spreads out to embed its edges in the side of the recess to securely fix it in place. Improved results may be obtained by utilizing a piece of base metal 5, for example brass in the bottom of the recess under the metal inlay 4. In this way the edges of the metal inlay are guided outwardly against the sides of the recess and do not scrape or embed in the bottom of the recess. While the use of a base metal 5 is illustrated herein and preferred, it is to be understood that the present invention is applicable to inlaying generally with or without the utilization of the base metal 5.

Figure 1:
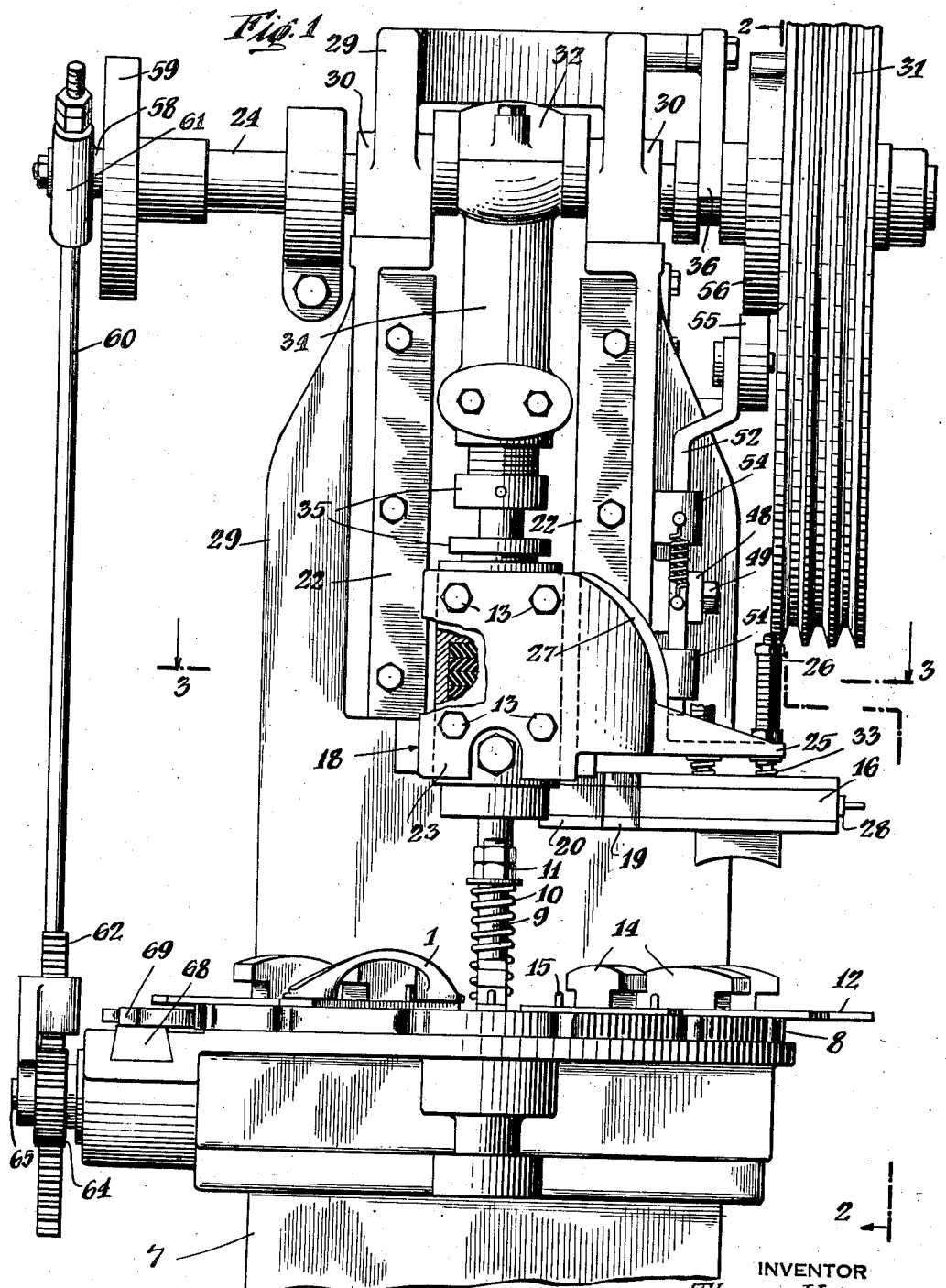
Figure 2:
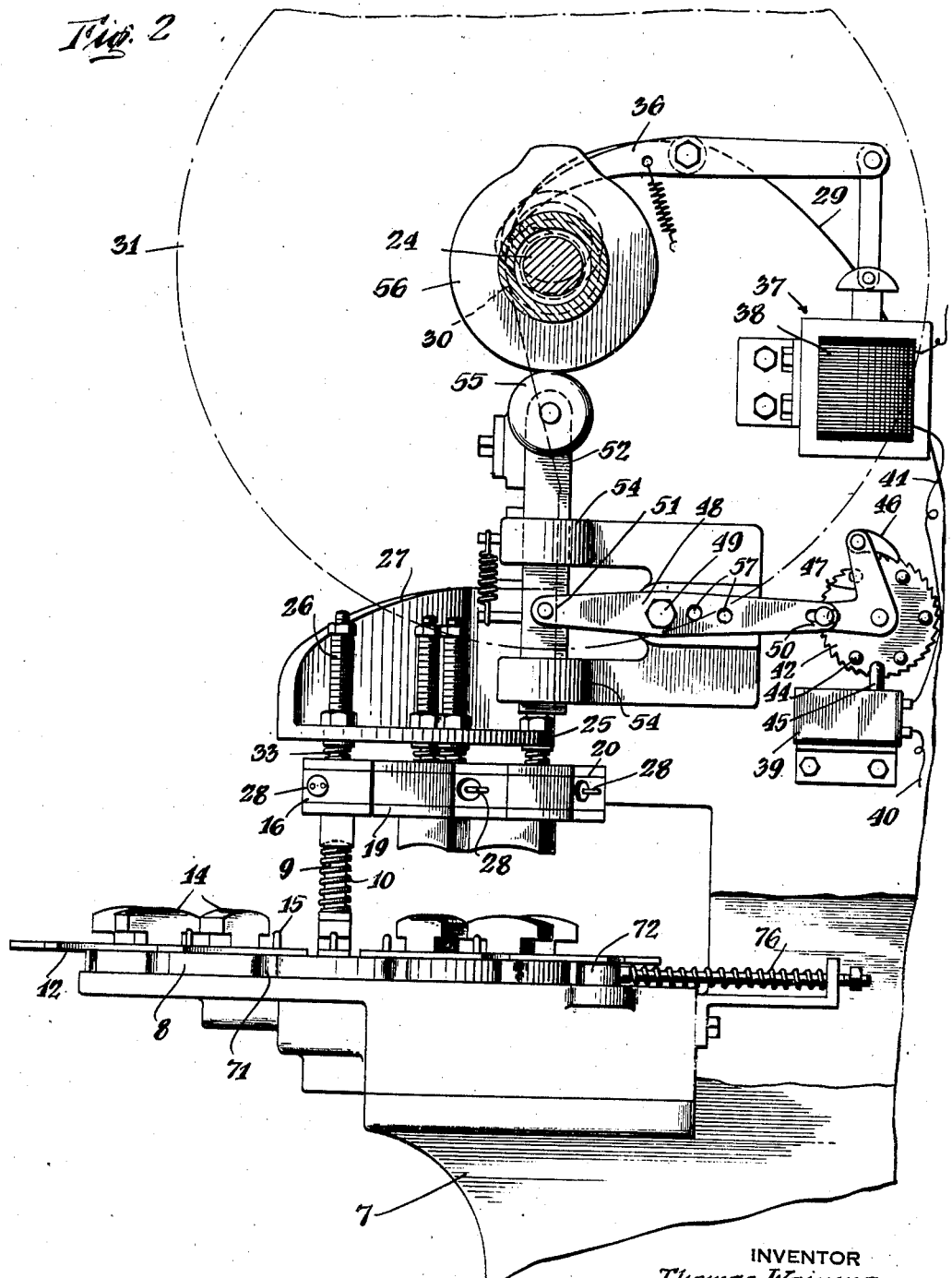
Fig. 2 is a side elevational view, partly in section, of the machine taken along the line 2—2 of Fig. 1.

Referring more particularly to Figs. 1 to 3 illustrating the present machine, there is shown a base 7 forming a platform or other suitable support for a rotatable table 8 secured to the base by a bolt 9 and resiliently retained against the support by a spring 10 which is adjustably held in position by nuts 11. The table 8 may be provided with any suitable work holders 12 for engaging and retaining the work pieces or articles to be inlaid and for presentation to the pressure applying head. The work holders will vary depending upon the type of articles being inlaid. In the embodiment illustrated in Figs. 1 to 6, work holders 12 are shown for the oven door handles 1 illustrated in Fig. 6 and, as illustrated in the detailed sectional view of Figs. 4 and 5, may comprise a central supporting part 14 and end pins 15. The pins 15 fit into recesses in the handle and the central supporting part 14 supports the middle of the handle directly under the inlay recess where the pressure is applied in inlaying the article. The work holders 12 may be secured to the table 8 in any suitable manner, for example, by the screws or bolts 17. A pressure member 21 is illustrated in Figs. 4 and 5 in effective position, and will be described hereinafter. Likewise the drive for intermittently rotating the table and accurately presenting the work holder to the pressure head will be described later.

The pressure head 18 utilized herein preferably comprises a plurality of pressure members 16, 19, 20 and 21. Each of the pressure members 16, 19 and 20 preferably includes heating means such as an electric heating coil 28 which will maintain the temperature of the inlay engaging surface in heated condition. Excellent results have been obtained with temperatures of about 400 degrees Fahrenheit, but higher or lower temperatures may be utilized if desired. The entire pressure head is mounted in guideways 22 for reciprocation in a vertical direction by means of a crank 32 on the crank shaft 24. The work holders on the table 8 are so positioned that an article is presented to each of the four heads and pressure and heat are applied to the first three articles and pressure alone to the fourth. The heat communicated from the pressure members to the metal inlay causes the inlay and the edges thereof to assume a temperature approaching the temperature of the pressure members, which in turn locally heats the sides or other portions of the recess where the edges of the inlay are being embedded and thus softens the material to facilitate embedding the edges therein. It has been found that with molded articles, such as "Bakelite," that heating the inlay and locally heating the part to be inlaid prevents chipping and cracking of the "Bakelite" and greatly facilitates the inlaying operation. With softer materials, the heating may be dispensed with, but with certain types of materials it is very desirable.

It will be noted that the pressure is applied in stages during the inlaying operation. The pressure member 16 is first applied to the inlay and thereafter in succession the pressure members 19, 20 and 21. As described above, the pressure members 16, 19 and 20 are heated to facilitate the embedding operation. If desired, these pressure members may be adjusted to apply greater pressure in each successive pressing operation. The pressure member 21 is not heated and is preferably cold in order to cool the inlay and cause it to assume the size that it normally has at atmospheric temperatures. The pressure applied will force the edges firmly into the sides of the recess and thus will fix it securely in position in its cold state. The contraction of the metal upon cooling, without this fourth operation, might cause the metal to loosen from the position fixed by the pressure member 20 and the tendency for it to become dislodged would be increased. The application of the cold pressure member eliminates loosening due to shrinkage by fixing the inlay in place while at normal temperatures.

The pressure head, as illustrated in the preferred embodiment, may comprise a flat plate 25 attached to the vertical reciprocating member 21 by the bolts 13. The pressure members are bolted to the plate 25 by means of the bolts 26 through the intermediation of springs 33 which may be adjusted as desired and the springs may have the proper strength to apply any desired pressure in the successive applications of pressure. A suitable reinforcing flange 27 may be formed on the plate 25 if desired. The pressure members may be heated electrically through the wires leading into the units 28.

The drive for and the operation of the pressure head will now be described. Extending upwardly from the base or support 7 is a casting 29 having bearings 30 at its upper end in which the crank shaft 24 is mounted. One end of the crank shaft has a fly wheel 31 thereon which may be driven by a suitable motor and belt (not shown). As the fly wheel 31 rotates the crank shaft 24, the pressure head 18 is reciprocated vertically by means of the crank or eccentric 32 and the rod 34 secured thereto. The pressure head may be adjusted vertically by means of the nuts 35. Normal operation of the machine would cause the pressure head to engage the work for a short period during each revolution of the fly wheel 31. In order to secure an extended pressing and heating operation, with the pressure members effective upon the inlays, a clutch 36 is provided and is adapted normally to stop the movement of the pressure head while in its lowest position. In other words, the power for driving the shaft 24 is disconnected from the shaft automatically by the clutch 36 when the head is in its lowest position. The opposite end of the clutch lever 36 is attached to the solenoid 37 of an electro-magnet 38. When the electromagnet 38 is operated to release the clutch member 36, the shaft 24 is rotated and the pressure head is raised to its upper position and lowered again to its effective pressure position where the clutch 36 again automatically stops it. The electric circuit through conductors 40 and 41 and the magnet 38 is closed by a switch 39 operated by a ratchet wheel 42. The pins or projections 44 on the ratchet wheel engage and depress a pin 45 which operates the switch 39 and closes the electrical circuit through wires 40 and 41 and the magnet 38 to release the clutch 36.

The ratchet wheel 43 is rotated by a ratchet 46 mounted on a bell crank 47. A lever 48 is pivotally mounted on the frame by means of a bolt 49 with one end 50 connected to the bell crank 47 and the other end 51 connected to a vertically movable rod 52 mounted in bearings 54. A roller 55 on the upper end of the rod 52 engages a cam 56 on the side of the shaft 24 adjacent the drive wheel 31 where it is not affected by the clutch 36 and, therefore, rotates continuously with the fly wheel 31. Upon each rotation of the fly wheel 31, the ratchet cam 56 forces downwardly the vertical rod 52 and oscillates the ratchet lever 48 to operate the ratchet member 46. In this manner, the switch 39 may be operated once in every desired number of rotations of the drive wheel 31. Thus a pressure head may be retained in its downwardly effective position for any desired period of time depending upon the article being inlaid and time required to obtain the best results. A period of several seconds has been found to give good results. The pressure period may be varied by changing the pivot position of the lever 48 which operates the ratchet. Three apertures 57 are shown at the middle of the lever 48 and others might be added to give any desired degree of variation. The shorter the left side of the lever, the shorter the periods of effective pressure and more rapid the operation of the clutch member 36.

A crank is provided on the end of the shaft 24 opposite the fly wheel 31 by means of a disc 59 and a connecting member 58 thereon. A rod 60 is attached to the member 58 at 61 to drive the work supporting table 8. The lower end of the rod 60 has a rack 62 formed thereon which meshes with a gear 64 on shaft 65. The opposite end of the shaft 65 has a gear 66 (Fig. 3) meshing with a horizontally mounted rack member 68.

Thus rotation of the shaft 24 reciprocates the rod 60 and rack 62 which in turn oscillate the shaft 65 to reciprocate the rack member 68. A pivoted member 69, somewhat like a ratchet, is mounted on the reciprocating member 68 and is retained against the periphery of the turn table by means of a spring 70. As the reciprocating member 68 moves back and forth, the ratchet member 69 engages the recesses 71 in the periphery of the turn table to rotate the turn table step by step and to present the work thereon to the pressure heads.

To lock the table 8 accurately in position, there is provided a member 72 having a projection 74 adapted to engage in the recesses 71 in the periphery of the table. The lever 72 has one of its ends pivoted at 75 and is held in effective position by means of the spring 76 forcing it against the periphery of the table. As the reciprocating table moving member 68 moves backward for engaging in another recess 71 to move the table 8, a projection 77 on the member 68 engages the free end of the lever 72 to unlock the table. As the member 68 moves in the opposite direction to rotate the table, the member 72 is permitted to engage the periphery of the table through the intermediation of the spring 76 to lock the table in proper position when the projection 74 enters the respective recesses 71 on the periphery of the table. In this manner the table is advanced one station and locked in position for each operation of the pressure head.

In the operation of the machine, an operator places a stove handle 1 or any other article to be inlaid on the pins 15 of the work holders 12 and simultaneously removes an inlaid article from a preceding holder. The operator may place the inlay in the recess of the article or the articles may be delivered to the operator with the inlay resting in the recess. Each article with the inlay thereon moves step by step to the pressure member 16 which applies heat and pressure to the inlay to fix it securely in the recess. The pressure members 19 and 20 in successive stages also apply heat and pressure to the inlay. The several pressure members give a series of operations and effective pressure applications sufficient to embed the edges of the metal inlay in the recess regardless of the type of molded material used. The final operation is performed by the pressure member 21 which is cold thereby cooling the inlay and causing it to shrink or contract to its normal size and at the same time forcing it firmly into the material. As described above, the pressure head 18 is normally retained in its lower effective position by means of the clutch 36 which is effective to disconnect the drive automatically when the pressure head is down. Continued rotation of the fly wheel 31 reciprocates vertically the rod 52 by means of the cam 56, which in turn rotates the ratchet wheel 42 by means of the lever 48 connected at one end to rod 52 and at its other end to the bell crank 47 carrying the ratchet 46. The ratchet wheel 42 has pins 44 thereon which engage pin 45 to operate the switch 39 and close the electric circuit through the magnet 38, which releases the clutch 36 causing the machine to begin another cycle. The table 8 is rotated by means of the crank 59 on shaft 24 through the intermediation of the rod 60 and rack 62 meshing with gear 64 on shaft 65. The gear 66 on the opposite end of the shaft 65 meshes with the rack 67 to reciprocate the driving member 68 for the turn table 8. The pivoted member 69 on the reciprocating member

68 moves the turn table forward one station for each reciprocation of the member 68. The turn table is locked in position by the lever 72 operated through the intermediation of spring 76. The projection 77 on the member 68 automatically engages the member 72 and unlocks the table during each backward stroke of the member 68.

As stated hereinbefore different shapes and types of articles may require special holders therefor. There is shown in Figs. 7 and 8 a holder for articles such as knobs or buttons used on the dash boards of automobiles. Referring more particularly to these figures, there is shown the turn table 8 having indexing peripheral slots 71 to permit the drive and positioning of the table for presentation of articles to be inlaid as described with respect to the embodiment illustrated in Figs. 1 to 6. Secured to the top of the table in any suitable manner is a series of work holders 80 here shown cylindrical in shape with the upper ends thereof recessed at 81 to receive and hold the buttons or knobs 82 to be inlaid. The upper side of the recess is shaped to fit and hold securely in position the underside of the buttons as shown more particularly in Fig. 8. Any suitable type of inlay may be applied to the button. As here shown the inlay 84 has a circular portion with bars extending across the lower half thereof. The table 8 is rotated as described above to present the buttons with the inlays in the recesses thereof to suitable pressure members (not shown in Figs. 7 and 8) such as pressure members 16, 19, 20 and 21. The same operations may be followed as described with respect to Figs. 1 to 6 to secure the inlays in place.

The buttons are small and lend themselves to automatic removal and for this purpose a duct 85 extends centrally through the holders 80 and connects with a tube 86 which is attached to a rubber tube 87. When the buttons reach the delivery station the tube 86 registers with the duct 85 and a blast of air is applied to blow the buttons 82 into the chute 88 from which they are dropped into a suitable receptacle. The shield 89 prevents the buttons from being blown out of the chute. If desired a cam operated knock-out pin may be used for removing buttons from the holders at the delivery station. The operation of the mechanism shown in Figs. 7 and 8 is otherwise the same as described in detail with respect to Figs. 1 to 6.

It will be seen that the present invention provides a simple machine which is very effective in operation. The metal inlay is applied in a series of stages and subjected for a period of time to both heat and pressure and is thereafter subjected to additional pressure and reduce to normal temperatures while pressure is being applied thereto. The duration of the periods of application of pressure may be changed as desired. Hard brittle materials such as "Bakelite" may be inlaid by the present method and machine without breaking or chipping. Maximum speed is obtained without reducing unduly the period of heat and pressure desirable for obtaining the best inlaying results. The machine is simple and rugged in construction and fully capable of withstanding any rough usage to which it may be submitted.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a machine of the class described, the combination of a plurality of pressure members for applying pressure to articles to be inlaid, heating means carried by a plurality of said pressure members, a plurality of holders for said articles, means for advancing said holders step by step to present the holders and articles thereon consecutively to a plurality of said pressing members, devices for forcing said pressure members against a plurality of articles on said holders, and mechanism for varying the period during which pressure is applied.

2. In a machine for inlaying articles, the combination of a movable head, a plurality of pressure applying members, means for resiliently mounting said pressure applying members on said movable head, means for adjusting said mounting means to vary the pressure applied to the inlays by the respective pressure applying members, a carrier having a plurality of article holders thereon adapted to support and carry articles to be inlaid with the inlay in position thereon, means for moving said carrier and said article holders beneath said pressure applying members in a step by step movement, and means for moving said movable head to force each of said pressure applying members against each of said articles, whereby pressure is applied in a plurality of stages to force the inlays into the articles.

3. In a machine of the class described, the combination of a movable head having a plurality of pressure applying members thereon, a plurality of said pressure applying members being heated to heat the inlays, a carrier having a plurality of article holders thereon adapted to support and carry articles to be inlaid with the inlay in position thereon, means for moving said carrier and said article holders beneath said pressure applying members in a step by step movement, and means for moving said movable head to force each of said pressure applying members against each of said articles, whereby heat and pressure are applied in a plurality of stages to heat the inlays and force them into the articles.

4. In a machine of the class described, the combination of a vertically movable head having a plurality of pressure applying members thereon, a plurality of said pressure applying members being heated to heat the inlays, a rotatable carrier having a plurality of article holders thereon adapted to support and carry articles to be inlaid with the inlay in position thereon, means for moving said carrier and said article holders beneath said pressure applying members in a step by step movement, and means for moving said movable head to force each of said pressure applying members against each of said articles, whereby heat and pressure are applied in a plurality of stages to heat the inlays and force them into the articles and devices for varying the period during which heat and pressure are applied to force the inlays into the articles.

5. In a press for forcing inlays into articles to be inlaid, the combination of a turn table having holders for the articles to be inlaid, a vertically movable pressing head having a plurality of pressure members thereon adapted to register with a corresponding plurality of said holders, certain of said pressure members being heated, and one of said pressure members being unheated, means for rotating the turn table step by step to present articles with inlays thereon to said pressure members, the movement of said turn table for each step being less than the distance required to move the pressed articles beyond the pressure head, so that pressure will be applied to the inlays in successive stages, and means for moving said pressure head to force said pressure members against the articles and the inlays thereon.

6. In a press for forcing inlays into articles to be inlaid, the combination of a turn table having holders for the articles to be inlaid, a vertically movable pressing head having a plurality of pressure members thereon adapted to register with a corresponding plurality of said holders, means for adjusting said pressure applying members with respect to said head, whereby the pressure member first engaging an article is adapted to apply the least pressure and the pressure member last engaging an article is adapted to apply the most pressure, means for rotating the turn table step by step to present articles with inlays thereon to said pressure members, the movement of said turn table for each step being less than the distance required to move the pressed articles beyond the pressure head, so that pressure will be applied to the inlays in successive stages, and means for moving said pressure head to force said pressure members against the articles and the inlays thereon.

7. In a machine of the class described, the combination of a pressing head having a plurality of members adapted to apply pressure to articles to be inlaid, a plurality of said pressure members being heated, means for independently varying the degree of pressure applied by each of said pressure members, and means for moving the pressure head to force the pressure members into engagement with the articles.

8. In a machine of the class described, the combination of a pressing head having a plurality of members adapted to apply pressure to articles to be inlaid, certain of said pressure members being heated and at least one of said pressure members being unheated, said unheated pressure member being effective on an article subsequent to the application of pressure thereto by a heated member, and means for moving the pressure head to force the pressure members into engagement with the articles.

9. In a machine of the class described, the combination of a pressing head having a plurality of members adapted to apply pressure to articles to be inlaid, certain of said pressure members being heated and at least one of said pressure members being unheated, said unheated pressure member being effective on an article subsequent to the application of pressure thereto by a heated member, means for moving the pressure head to force each of the pressure members into engagement with the articles consecutively, the pressure applying being increased in the successive stages of application.

10. In a machine of the class described, the combination of a pressure head, means for forcing said head into effective position, and means including a ratchet for retaining said head in effective position for a predetermined period of time.

11. In a machine of the class described, the combination of a pressure applying head, a power driven shaft for moving said head into effective position, a clutch for stopping the head in effective pressure applying position, and automatic devices including a ratchet for operating said clutch to move said head out of effective position after a predetermined period.

12. In a machine of the class described, the combination of a pressure applying head, a power driven shaft for moving said head into effective position, a clutch for stopping the head in effective pressure applying position, automatic devices including a ratchet for operating said clutch to move said head out of effective position after a predetermined period, and means for changing the amount of movement of the ratchet to control the period that the pressure head is effective.

13. In a machine of the class described, the combination of a pressure applying head, driving means for reciprocating said head, a turn table beneath said head having work holders adapted to present articles to be inlaid to said head, a rack operatively connected to said driving means to be reciprocated thereby, means for operatively connecting said rack to said turn table to rotate the turn table intermittently, means for locking said turn table in predetermined position, and means operatively connected to said rack for unlocking said locking means.

14. In a machine for inlaying articles, the combination of a movable head, means for mounting a plurality of pressure applying members on said movable head adapted to apply pressure to inlays, means for adjusting said mounting to vary the pressure applied to the inlays by the respective pressure applying members, means for heating certain of said pressure applying members to transfer heat to the inlays during the pressure applying operation, a carrier having a plurality of article holders thereon adapted to support and carry articles to be inlaid with the inlay in position thereon, means for moving said carrier and said article holders beneath said pressure applying members in a step-by-step movement, and means for moving said movable head to force each of said pressure applying members against said articles whereby pressure is applied in a plurality of stages to force the inlays into the articles.

THOMAS WAINMAN.